United States Patent
Pierret et al.

(10) Patent No.: US 7,196,439 B2
(45) Date of Patent: Mar. 27, 2007

(54) DEVICE FOR COOLING THE POWER ELECTRONICS INTEGRATED AT THE REAR OF AN ALTERNATOR OR A REVERSE ALTERNATOR

(75) Inventors: Jean-Marie Pierret, Paris (FR); Michel Fakes, Seclin (FR); Dirk Schulte, Fontenay-sous-Bois (FR); Jean Julien Pfiffer, Montgeron (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 10/532,183

(22) PCT Filed: Oct. 28, 2003

(86) PCT No.: PCT/FR03/03217

§ 371 (c)(1),
(2), (4) Date: Dec. 2, 2005

(87) PCT Pub. No.: WO2004/040738

PCT Pub. Date: May 13, 2004

(65) Prior Publication Data

US 2006/0181162 A1    Aug. 17, 2006

(30) Foreign Application Priority Data

Oct. 28, 2002    (FR) .................................. 02 13431

(51) Int. Cl.
*H02K 9/02*    (2006.01)
*H02K 11/00*    (2006.01)

(52) U.S. Cl. ..................... 310/58; 310/64; 310/68 R; 310/89; 310/68 D (58) Field of Classification Search .................. 310/64
See application file for complete search history.

(56) References Cited

U.S. PATENT DOCUMENTS

| | | | | |
|---|---|---|---|---|
| 4,284,915 A | * | 8/1981 | Hagenlocher et al. | 310/68 D |
| 4,418,295 A | * | 11/1983 | Shiga | 310/59 |
| 4,773,829 A | * | 9/1988 | Vettori | 417/366 |
| 4,926,076 A | * | 5/1990 | Nimura et al. | 310/68 D |
| 5,659,212 A | * | 8/1997 | DePetris | 310/68 D |
| 5,677,616 A | * | 10/1997 | Ooiwa | 322/17 |
| 5,757,096 A | * | 5/1998 | DuBois et al. | 310/68 D |

(Continued)

FOREIGN PATENT DOCUMENTS

DE    197 05 228 A1    8/1998

(Continued)

*Primary Examiner*—Burton Mullins
(74) *Attorney, Agent, or Firm*—Osha Liang LLP (57) ABSTRACT

The invention concerns a rotating electrical machine, in particular an alternator or an alterno-starter for a motor vehicle, comprising: a rotor (1) centered and fixed on a rotating shaft (2) supported by at least one rear bearing (4), the rear bearing (4) including radial cooling fluid outlets (4a, 4d); a stator (3) enclosing the rotor, the stator including a field coil (7) including windings constituting phases of the electrical machine; an electronic power circuit (15) connected to the windings of the stator phases; a heat dissipation bridge (16) including a first surface whereon is mounted the electronic power circuit and a second surface, opposite said first surface and oriented towards the rear bearing, said second surface forming a longitudinal wall of a passageway (17) for cooling fluid circulation, another longitudinal wall of said passageway (17) being formed by the rear bearing (4) supporting the stator wherein the second surface of the heat dissipating bridge (16) comprises cooling means (18) arranged in the fluid circulation passage (17).

20 Claims, 4 Drawing Sheets

U.S. PATENT DOCUMENTS

| | | | |
|---|---|---|---|
| 6,114,783 A * | 9/2000 | Asao | 310/58 |
| 6,169,345 B1 * | 1/2001 | Bloch et al. | 310/67 R |
| 6,175,171 B1 * | 1/2001 | Rupp et al. | 310/52 |
| 6,275,404 B1 * | 8/2001 | Shichijyo et al. | 363/145 |
| 6,285,100 B1 * | 9/2001 | Pflueger et al. | 310/68 D |
| 6,577,032 B2 * | 6/2003 | Irie | 310/68 D |
| 6,731,030 B2 * | 5/2004 | Keidar et al. | 310/68 D |
| 6,812,604 B2 * | 11/2004 | Braun et al. | 310/68 D |
| 6,958,557 B2 * | 10/2005 | Shichijyo | 310/68 D |

FOREIGN PATENT DOCUMENTS

| | | | |
|---|---|---|---|
| DE | 101 11 295 A1 | | 9/2002 |
| EP | 1032114 A1 | * | 8/2000 |
| JP | 60-35944 | * | 2/1985 |
| JP | 4-17551 | * | 1/1992 |

* cited by examiner

DEVICE FOR COOLING THE POWER ELECTRONICS INTEGRATED AT THE REAR OF AN ALTERNATOR OR A REVERSE ALTERNATOR

BACKGROUND OF INVENTION

1. Field of the Invention

The invention concerns a device for cooling the power electronics integrated at the rear of a reversible electric machine such as an alternator or an alterno-starter of an automobile. The invention has applications in the automobile industry and, in particular, in the area of alternators and alterno-starters for automobiles.

2. State of the Technology

In an automobile, the alternator can transform the rotating movement of a winding rotor, driven by the thermal motor of the vehicle, into an induced electric current in the field coil of the polyphased stator. In general, this stator is comprised of three phase windings, so that the alternator is the triphased type. The three phases of the armature are connected to a bridge rectifier. This bridge rectifier has three branches, each comprised of at least two diodes connected to each phase. Now, these diodes generate heat. Traditionally, the bridge rectifier can dissipate energy of about 150 watts. Therefore, it must be cooled to avoid any overheating of the diodes.

Figure 1:
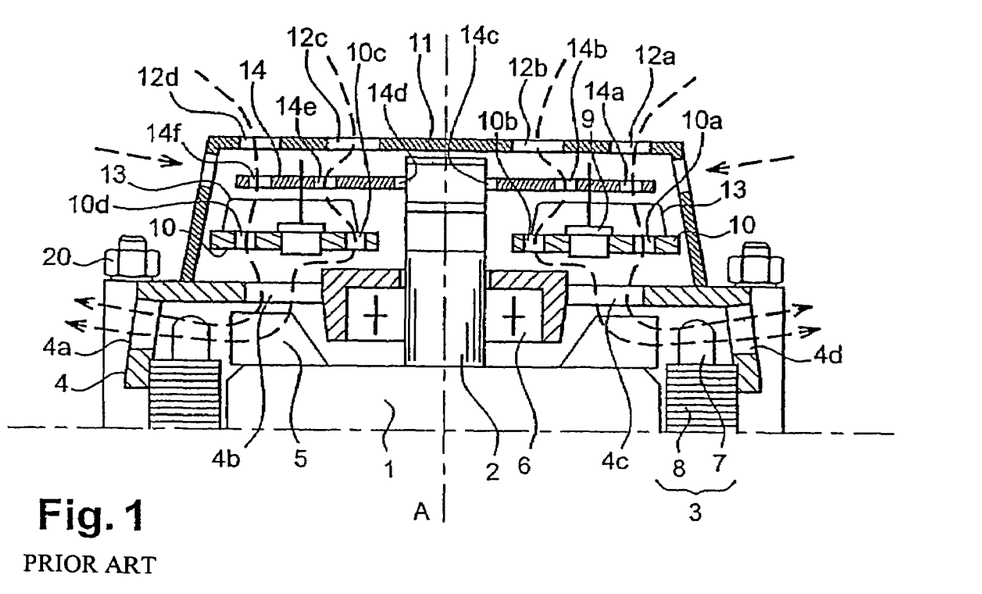
FIG. 1, already described, represents the rear part of a traditional alternator with a traditional cooling device.

FIG. 1 shows an example of the rear portion of a conventional alternator. This alternator has a rotor 1 mounted on a rotating shaft 2, and the axis of rotation is referenced A and forms the axis of the machine as visible also in document DE A 197 05 228. This rotor 1 is surrounded by a stator 3 comprised of a magnetic circuit 8 and an field coil 7. The stator 3, via its circuit 8 and its winding 7 generate an alternating current. The field coil has phase windings connected in a star and/or triangle. Each of these windings has an output connected to the bridge rectifier. The current generated in stator 3 is rectified using the bridge rectifier containing the diodes 9. This stator 3 is supported by a rear bearing 4 and a front bearing (not shown). The rotating shaft 2 is held by the two bearings with rolling bearings 6. As described in document DE A 0 197 05 228, the magnetic circuit 8 comprises a stator body in the form of a packet of sheets which, as is known, contains notches, advantageously the semi-closed type, for mounting the windings of the phases crossing the body of the stator and extending on either side of the body to form chignons. In this document, one sees the front bearing of the alternator, as well as the alternator pulley, which is designed to be driven in rotation by the thermal motor of the vehicle via a transmission that has at least one belt, and the internal fans carried by the rotor and placed radially beneath the chignons, for internal ventilation of the alternator. To do this, the bearings, which are hollow, have intake and outtake outlets as described below. The rear fan, referenced as 5 on FIG. 1, is advantageously more powerful than the front fan.

In this alternator, one part of the dissipating elements, i.e. the positive diodes 9 of the bridge rectifier, are mounted in a heat energy sink bridge 10. This heat dissipating bridge has openings 10a–10d, also called outlets, in which the cooling air circulates.

The diodes 9 are connected electrically to a connector 14 which also has air passageways 14a–14f.

In addition, the heat dissipating bridge 10 has fins 13 on the upper surface, which encourage cooling of the heat dissipating bridge 10.

More specifically, the alternator in FIG. 1 has, in the rear part, a cover 11 that surrounds and protects the power electronics of the alternator corresponding notably to the bridge rectifier. To allow the passage of air inside the cover 11, the cover is equipped with openings 12a–12d, also called outlets. These openings are placed primarily in the upper part of the cover 11. In addition, the rear fan 5 is mounted on the rotating shaft 2 or on the rotor 1 suction air inside the alternator. This fan can be the centrifuge or helico-centrifuge type, for example. In this way, the air, suctioned by the fan 5, enters the rear part of the alternator through the outlets 12a–12d and, channeled by the fins 13, hits the heat dissipating bridge 10 and the diodes 9 and, as a result, cools them. The air then leaves radially through the outlets 4a–4d installed in the rear bearing 4 of the stator 3.

Thus, the air is suctioned primarily into the axis of the alternator at the level of the protective cover 11, then it is laterally discharged through the outlets of the rear bearing 4, cooling the bridge rectifier, but also the other hot parts of the alternator, such as the chignons of the field coil 7.

For more details, the path taken by the cooling air flow is shown, on FIG. 1, by dotted lines and arrows. Refer also to document DE A 197 05 228, which describes an example of a bridge rectifier fabrication and an example of a rotor in the form of a rotor with prongs. Document DE A 101 11 295 describes another type of bridge rectifier. In these two documents, the negative diodes are supported by the rear bearing and are mounted on a plate attached to the rear bearing or fitted into the rear bearing, while the positive diodes are mounted on a plate away from the negative diodes. In document DE A 100 11 295, this plate has an opening. This plate corresponds to the heat dissipating bridge 10 in FIG. 1; the diodes 9 are the positive diodes, as described above.

Currently, there are also reversible alternators, which can form an electric motor that drives in rotation the thermal motor of the vehicle via the rotor shaft integrated with the pulley of the alternator. Such a reversible alternator is called an alterno-starter, or an alternator-starter, and transforms mechanical energy into electrical energy and vice versa. Thus, an alterno-starter can start the engine of the automobile, or act as an auxiliary motor to assist the thermal motor of the vehicle to drive this automobile vehicle.

In this case, the bridge rectifier located at the outlet of the armature of the alterno-starter, i.e. connected to each phase of the armature, also acts as a bridge to control the phases of the alterno-starter. This bridge rectifier has three branches, which each have at least two MOS-type power transistors. The transistors of this bridge rectifier are each controlled by a control unit. This control unit may be made in various ways. Most often, this control unit has a driver associated with a comparator and other electronic components. A bridge rectifier made in this way from power transistors and control units dissipates less energy than the energy dissipated by a bridge of diodes. In effect, when the bridge rectifier operates in rectifying mode, and not in control mode, then the power transistors are controlled in a synchronous way. For more information, refer for example to document EP A 1, 134,886. However, the energy dissipated is about 50 watts and the bridge rectifier must, therefore, be cooled.

Now, the control units as they have just been described are relatively large, so that the mounting of these control units and power transistors on a heat dissipating bridge leaves no room on the heat dissipating bridge for outlets. Therefore, it is not possible to cool the bridge with power transistors by air circulation as shown on FIG. 1.

In other words, the arrangement explained above requires making axial air passageways through the heat dissipating bridge and the connector, which reduces the space available to place electronic components. In fact, this available space is sufficient to place a bridge rectifier with diodes, but is not sufficient for a larger power electronics unit. In particular, in the case of an alterno-starter, the power electronics are such that each diode of the bridge rectifier is replaced by at least one transistor and one control unit.

To solve this space problem, patent application EP-A-1 032 114 proposes a cooling device for the power electronics of an alterno-starter in which the dissipating elements are comprised of a plated base on the rear bearing of the alterno-starter, and this rear bearing is comprised of channels for the passage of the cooling air. In other words, in this device, the heat dissipating bridge is placed against the rear bearing which has, on its rear outside surface, cooling fins. Thus, the air arrives laterally or radially and cools through convention first, the rear bearing with the fins and, second, the heat dissipating bridge on which the power electronics are mounted. In addition, the heat dissipating bridge is also cooled by conduction through the fins of the rear bearing with which it is in mechanical contact.

However, in such a device, it is necessary for the heat dissipating bridge, or base, to be placed securely against the bearing so that the power electronics can be cooled. In effect, if any space exists between the base and the surface of the bearing, then thermal conduction will not occur or will be poor between the base and the bearing and, as a result, there is only partial cooling of the power electronics.

In addition, if the rear bearing is very hot, it will also be difficult to cool the heat dissipating bridge by convection.

SUMMARY OF INVENTION

One purpose of the invention is to correct the technical disadvantages described above and propose an improved and more reliable device to cool the power electronics of an alternator or an alterno-starter of an automobile vehicle, in which the cooling fluid is introduced laterally in the rear part of the machine and circulates in a fluid flow passageway formed between the heat dissipating bridge and the rear bearing of the alternator.

For this purpose, the invention proposes a rotating electrical machine, notably an alternator or an alterno-starter, for an automobile vehicle, comprising:
a rear bearing;
a rotor center and mounted on a rotating shaft supported by at least the rear bearing;
the rear bearing containing radial outlets for the exit of cooling fluid;
a stator surrounding the rotor;
the stator comprised of an field coil that includes windings that form phases of the electrical machine;
an electronic power circuit connected to the windings of the stator;
a heat dissipating bridge that has a first surface on which the power electronics circuit is mounted, and a second surface, opposite said first surface, and oriented toward the rear bearing;
said second surface forms a longitudinal wall with a passageway for the flow of cooling fluid; another longitudinal wall of this passageway is formed by the rear bearing supporting the stator in which the second surface of the heat dissipating bridge has cooling means arranged in the fluid flow passageway.

In one form of fabrication, the cooling means include fins.

In another form of fabrication, the cooling means include columns, in circular section or diamond shape, for example.

With this arrangement, one can easily machine the free ends of the columns so that said columns, in one fabrication method, come in contact with the rear bearing. These columns make the heat dissipating bridge rigid.

In a variant, the second surface of the heat dissipating bridge is sectioned, in a cambered section for example, to deviate the fluid and/or to create a venturi effect.

All combinations are possible.

For example, the columns can be combined with the fins, with the cooling means having columns and fins.

Thus, as the cooling means are mechanically integrated with the bridge holding the power electronics and not integrated with the rear bearing, cooling of the power electronics is guaranteed, whatever the heat produced by the rear bearing. In effect, the device according to the invention achieves a thermal decoupling between the rear bearing and the heat dissipating bridge so that the heat cannot be propagated by conduction. Likewise, according to the invention, convection cooling of the second surface of the heat dissipating bridge cools power electronics comprised of many electronic components.

The invention is advantageously completed by the following different features, taken separately or in all possible combinations:
the cooling means, such as the fins and/or the columns are arranged radially in the direction of the flow of the cooling liquid to reduce charge losses;
the cooling means, such as the fins and/or the columns, form cooling channels radially oriented so as to cool the heat dissipating bridge over its entire radial extension;
the rear bearing holds deflectors placed at the outlet of the radial outlets of the rear bearing so that the cooling fluid that exits through the radial or lateral outlets of the rear bearing is not picked up by the flow of cooling liquid entering radially. In this way, relooping of the cooling fluid flow is avoided;
a protective cover covers the power electronics and the heat dissipating bridge and has at least one raised end to form a deflector;
the protective cover has at least one opening for the passage of the fluid;
at least one space between the rotating shaft and the heat dissipating bridge forms an axial fluid flow passageway;
the heat dissipating bridge forms a mezzanine above the rear bearing of the stator;
the heat dissipating bridge is mounted on the bearing of the stator with mounting braces;
the heat dissipating bridge is mounted above the rear bearing using contacts integrated with the rear bearing or the heat dissipating bridge;
a layer of electrically insulating material is placed between the heat dissipating bridge and the rear bearing;
the axial ends of the fins and/or the columns integrated in the heat dissipating bridge are placed away from the rear bearing;
the heat dissipating bridge, comprising the cooling means, and the bridge bearing the power electronics are made in one piece;

the heat dissipating bridge, comprising the cooling means, is brought to the bridge holding the power electronics to form a heat dissipating bridge in two parts;

the power components are placed on tracks;

the tracks are integrated with the heat dissipating bridge;

the tracks are electrically insulated from the heat dissipating bridge.

The columns and/or the fins may be comprised, at least in part, of heat pipes.

In one form of fabrication, the rear fan has at least two superimposed parts, as described for example in document FR A 2 741 912, for an increase in the number of blades and the power of the fan.

The cooling means according to the invention have at least one projection directed toward the rear bearing and integrated with the second surface of the bridge.

DETAILED DESCRIPTION OF METHODS FOR FABRICATING THE INVENTION

In these figures, the common elements will be assigned the same reference numbers.

Figure 2:
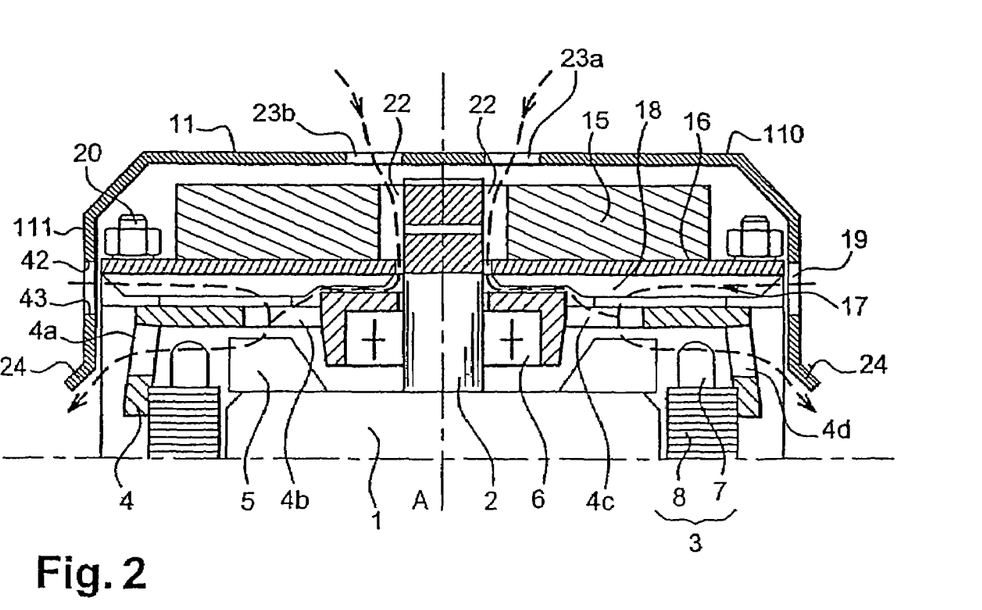
FIG. 2 shows the rear part of an alterno-starter in which the cooling fluid enters and leaves laterally.

FIG. 2 shows a side cross-section of the rear of an alterno-starter with a cooling device according to the invention. Like all known alterno-starters, the alterno-starter shown in FIG. 2 has a rotor 1 mounted on a rotating shaft 2 with axis A. This rotor 1 is surrounded by a stator 3 with a body 8 in the form of a packet of notched sheets crossed by the windings of an field coil 7. The stator 3 is supported by a rear bearing 4 and a front bearing (not shown), which maintains the rotating shaft 2 through rolling bearings 6. The rotor is, for example, a rotor with prongs, as described in documents DE A 197 05 228 or EP A 0515 259 to which we will refer for more details. In a variant, this rotor has projecting poles, for example, of the hybrid type with projecting poles, which alternate circumferentially with permanent magnets as described in document WO 02/054566 to which we will refer.

As previously explained, the alterno-starter contains a bridge rectifier with MOS power transistors, which is associated with control units, called drivers, for these power transistors. This bridge rectifier and these control units together form the power electronics, called the power electronic circuit of the alterno-starter, referenced as 15 in FIG. 2. These electronics or power circuit 15 is mounted on the upper surface, called the first surface, of a heat dissipating bridge 16 described hereinafter.

According to the invention, the lower surface, called the second surface, which is axially oriented toward the rear bearing 4 of the electrical machine of this heat dissipating bridge 16, forms a wall for the longitudinal or radial flow passageway 17 for the cooling fluid in the alterno-starter. The other wall of this passageway 17 is, therefore, formed by the upper surface of the rear bearing 4 described hereinafter.

According to the invention, the protective cover 11 has openings 19 located opposite the flow passageway 17. These openings communicate with the external periphery of the passageway 17. In this way, the cooling fluid, air in particular, is introduced into the rear of the alterno-starter through these openings 19, then circulates in the passageway 17, under the heat dissipating bridge 16, cooling the power electronics 15. A rear fan 5, mounted on the rotating shaft 2 or on the rotor 1, ensures the aspiration of the air inside the passageway 17. The openings 19 are advantageously distributed circumferentially and evenly on the external periphery of the cover 11.

Figure 3:
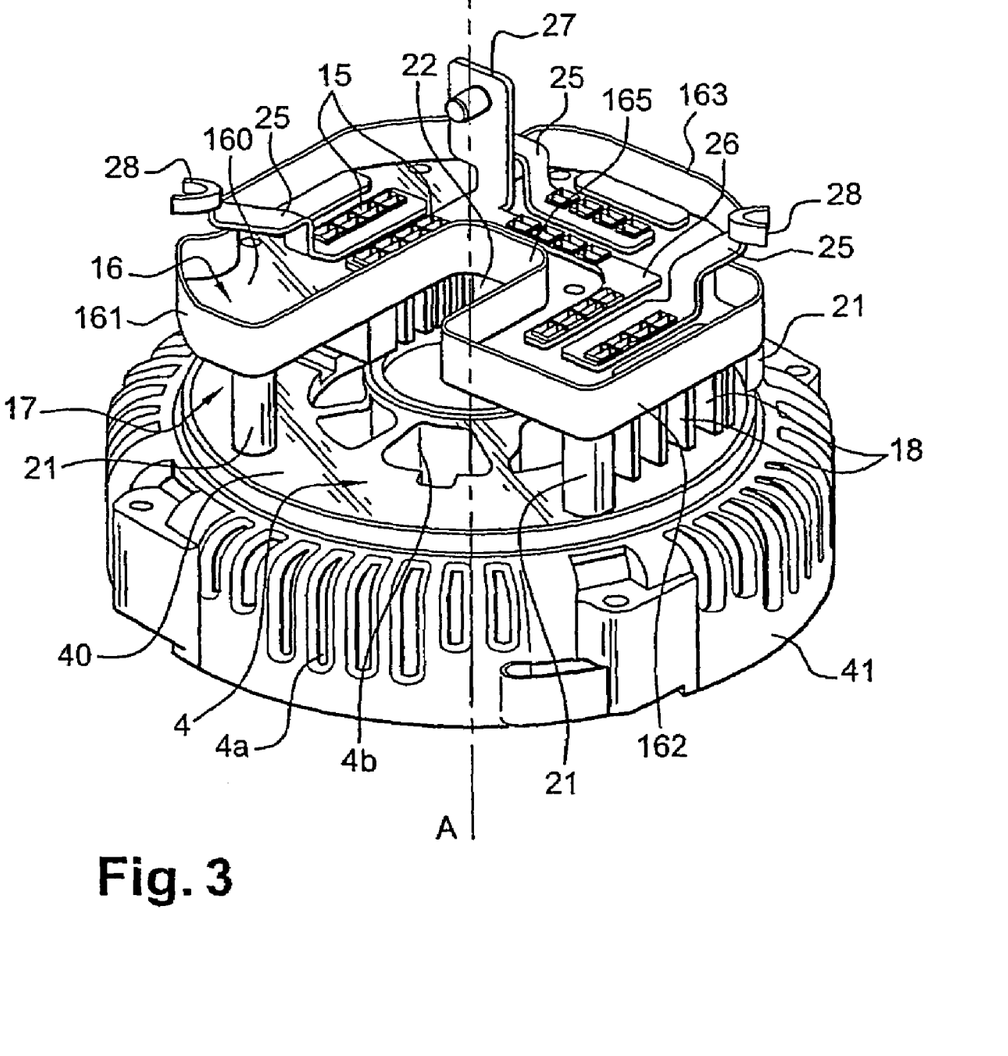
FIG. 3 shows the rear part of an alterno-starter with the mezzanine on which the power electronics are placed.

Fabricated in this way, the heat dissipating bridge 16 forms a mezzanine above the rear bearing 4. FIG. 3, which represents a profile view of the invention cooling device, shows this mezzanine. This FIG. 3 will be described in detail later.

According to the invention, the heat dissipating bridge 16 has cooling means 18 on its lower surface.

In other words, the lower surface of the bridge 16 is configured to form cooling means 18.

These cooling means 18 are arranged in the passageway 17 and ensure the flow of the cooling fluid according to a selected path, i.e. so that the fluid penetrates very close to the rotating shaft to lap against the lower surface of the heat dissipating bridge. In this way, the lower face of the heat dissipating bridge is cooled over the entire radial distance between the external periphery and the internal periphery close to the shaft and the heat dissipating bridge.

In FIG. 3, the heat dissipating bridge 16 is in the form of a U. This heat dissipating bridge 16 thus has two branches 161, 162 and one head 163 connecting the branches 161,162.

A central axial passageway 22, delimiting the internal periphery from the heat dissipating bridge, is present between the two branches 161, 163. This passageway is also delimited by the internal periphery 165 of the head 163. This central passageway 22 is crossed by the axis A and is sized to be larger than the size of the shaft 2.

Thanks to this passageway 22, the fluid penetrates very close to the shaft 2 as described below.

In this FIG. 3, this heat dissipating bridge is hollow so that it has a U-shaped bottom 160, the perimeter of which is delimited by an edge 166, which is here perpendicular to the bottom 160 that is transversally oriented in relation to the axis A.

The axial passageway 22 is thus in the form of a channel.

In FIGS. 2 and 3, the cooling means consists of cooling fins 18.

The adjacent fins form radial channels guiding the cooling fluid in the passageway 17 that communicates with passageway 22.

These channels are flared, from the internal periphery of the heat dissipating bridge 16 to the external periphery of the heat dissipating bridge. These internal and external peripheries of the heat dissipating bridge 16 delimit the passageway 17 in combination with the rear bearing 4. Here, the fins have a radial orientation in relation to a center defined by the axis A and here are of constant height.

Thus, these channels have a lower surface formed by the rear bearing, the two sides opposite two adjacent fins, and the U-shaped bottom 160 of the heat dissipating bridge formed between two adjacent fins. Advantageously, the heat dissipating bridge containing the fins and the bridge holding the power electronics are in one piece, thus forming a one-piece heat dissipating bridge.

The fins come, for example, from molding with the heat dissipating bridge and are advantageously thin to increase the number of fins and improve the surface for thermal exchange with the air.

As a variant, the heat dissipating bridge may be moved onto the bridge holding the power electronics, thus forming a heat dissipating bridge in two parts. The fluid is then evacuated through outlets 4a–4d made in the rear bearing 4. These outlets 4a–4d are preferably identical to those made in an alternator bearing, like the one shown in FIG. 1. Advantageously, the fins 18 are arranged radially in the direction of the flow of the fluid, concentrating toward the central outlets 4b and 4c of the hollow rear bearing 4.

More specifically, this bearing 4 has a bottom 40 drilled centrally for passage of the shaft 2. This bottom presents a housing for mounting the support ball bearing 6 of the shaft 2 and is extended at its external periphery by an annular edge 41. The bottom 40 and the edge 41 are respectively oriented transversally and axially in relation to axis A.

The aforementioned upper surface of the bearing 4 is, therefore, formed by the upper surface of the bottom 40, which forms one of the walls of the passageway 17.

The edge 41 carries inside the body 8 of the stator 3.

The central outlets 4b, 4c belong to the bottom 40, while the other outlets, i.e. the lateral or radial outlets 4a, 4d, belong to the edge 41.

In this FIG. 3, only one (4b) of the central outlets and one (4a) of the lateral outlets are referenced. The central outlets, close to the central opening of the bottom 40, are window-shaped, while the lateral outlets are oblong and located radially above the part, called the chignon, of the windings of the field coil 7 which projects from the body 8. The winding is then cooled thanks to these lateral outlets.

Thus, in the invention, the air (or any other cooling fluid) is suctioned laterally through the openings 19 in the alterno-starter and flows toward the central outlets 4b and 4c of the bearing 4, while lapping against the cooling elements of the heat dissipating bridge, i.e. the fins 18, over their entire length before evacuating through the lateral outlets 4a and 4d of the bearing 4. Thus, the power electronics 15, more specifically the components of the power electronics, is cooled by conduction, after cooling of the heat dissipating bridge 16 via the cooling means 18, here in the form of fins 18.

In addition, since the heat dissipating bridge 16 and the electronics or power electronics circuit 15 are at a distance from the rotating shaft, there is, between this rotating shaft 2 and the heat dissipating bridge 16, a space 22 through which the air can also circulate. This space 22 forms an axial flow channel for the fluid. According to one method of fabricating the invention, central outlets 23a and 23b are made in the protective cover 11. Air is then suctioned through these outlets 23a and 23b in the alterno-starter, then flows through space 22 along the rotating shaft 2 and joins the flow passageway 17 under the heat dissipating bridge 16. In this way, the power electronics are cooled—first laterally by the passageway 17 and, second, axially through the space 22. This additional axial air flow crossing the space 22 also allows much better cooling of the internal parts of the alternator, such as the ball bearings 6 and the chignons of the windings of the field coil 7, through an increase in the total air flow in the machine.

The path of the cooling fluid flow in the rear of the alterno-starter is shown by dotted arrows and lines on FIG. 2.

According to a preferred method of fabrication of the invention, deflectors 24 are placed downstream from the outlets 4a and 4d made in the rear bearing 4, more specifically in FIG. 2 axially downstream from the rear edge 42 of the outlets 4a and 4d close to the bottom 40. These deflectors 24 separate the flow of incoming fluid from the flow of outgoing fluid so that the fluid leaving the alterno-starter is not immediately reintroduced in the passageway 17. In this way, significant recirculation of the hot fluid coming from the inside of the alterno-starter is avoided.

These deflectors 24, placed at the outlet of the lateral outlets 4a and 4d of bearing 4, are carried by the rear bearing. Thus, in one fabrication method, the deflectors can be mounted on the bearing 4, close to the lateral outlets 4a and 4d of the bearing. They may also be carried by the rear bearing, as they are made in the protective cover 11, for example, by raising the free end of the protective cover as shown in FIG. 2.

This cover, carried by the bearing 4 and advantageously made of plastic, is hollow like the rear bearing 4. Thus, it has (FIG. 2) a bottom 110, oriented transversally in relation to the axis A, extended at its external periphery by an annular edge 111 that is axially oriented in relation to the axis A.

The central outlets 23a and 23b are made in the bottom 110, while the openings 19, in the form of outlets, are made in the edge 111.

The deflectors 24 are here connected together to form the free end of the edge 111 which is flared, which makes it easy to mount the cover on the edge of the rear bearing. The base 124 of this end 24, which facilitates the mounting of the cover 11, is placed axially and, in this case, slightly indented in relation to the front edge 43 of the outlets 4a, 4b. This base 124 is, therefore, placed axially between the edges 42, 43. In a variant, the free end of the edge has an alternation of flared portions, i.e. raised, at the outlet of the outlets 4a, 4b and unraised or chamfered portions to facilitate the mounting of the cover. In a variant, the edge 111 of the cover has an edge that projects radially and is profiled according to the crankcase of the vehicle motor to form a deflector. This edge, which forms a partitioning means, is placed upstream from the outlets and downstream from the openings as described in document EP A 0 740 400.

In the fabrication method of the invention shown in FIG. 2, the protective cover 11 envelops the entire rear part of the alterno-starter, i.e. it envelopes the power electronics 15 mounted on the heat dissipating bridge 16 and all of the rear bearing 4. In this case, the protective cover 11 may have outlets located downstream from the lateral outlets of the rear bearing, which are intended to allow the evacuation of the fluid outside the alterno-starter. It may also have, in addition or instead of these outlets, one or more deflectors 24 opposite the lateral outlets 4a, 4d. These deflectors may be placed in the cover itself.

The protective cover 11 may also envelope the power electronics mounted on the heat dissipating bridge and the upper part of the bearing 4, i.e. it does not envelope the lateral sides of the bearing containing the outlets 4a and 4d. In this case, the deflectors may be mounted on the bearing 4 or made by raising the free end of the cover.

According to one characteristic, the heat dissipating bridge 16 is mounted on the rear bearing 4 using mounting braces or bolts 20. According to one fabrication method, the mounting braces or bolts, generally the mounting means 20, are the same as those used to normally mount the bearing 4 with the magnetic circuit 8 of the stator 3, i.e. the same braces as those shown in FIG. 1. These braces, for example in the form of long screws, are visible, for example, in FIG. 1 of document EP A 0515 259.

In another method of fabricating the invention, the heat dissipating bridge 16 is mounted on the bearing 4 with mounting contacts 21. These mounting contacts may be integrated in the heat dissipating bridge 16 or the bearing 4.

FIG. 3 shows, in profile, the cooling device of the alterno-starter alone. In other words, the rotor, the stator, and the rotating shaft are not shown on this FIG. 3. Therefore, we see on this FIG. 3 the rear bearing 4 with the heat dissipating bridge 16 that forms a mezzanine above the bearing 4. In the fabrication method shown in this figure, the mezzanine is mounted on the bearing 4 with mounting contacts 21. There are at least two of these mounting contacts. They are distributed between the fins 18. The contacts 21 are placed near the external periphery of the flange 40, i.e., radially above the central outlets 4b.

On this FIG. 3, it can be seen that the fins 18 are axially shorter than the contacts and that they are not in physical contact or electrical contact with the rear bearing 4. For example, a 2 mm space can separate the axial ends of the fins 18 and the bottom 40 of the rear bearing 4.

In the example in FIG. 3, the heat dissipating bridge 16 forms approximately ¾ of the bottom surface of the bearing 4, around the rotating shaft. On the upper surface of this bridge 16, the components 15 constitute the power electronics of the alterno-starter. It should be noted that the surface of the heat dissipating bridge may vary as a function of the number and size of the components to be mounted.

With the arrangement of the cooling device just described, it is possible to connect the alternator and the bridge rectifier to a ground that may be different for each one.

In addition, the electrical machine may have a layer of electrically insulating material, placed between the lower surface of the heat dissipating bridge and the rear bearing, to avoid any risk of electrical contact between these two elements. Advantageously, this layer of insulating materials is attached to the external surface of the rear bearing and also contains air passage outlets opposite the outlets of the rear bearing for the passage of the cooling fluid.

According to one fabrication method, the electronic components 15 are placed on conducting tracks 25, 26. These tracks 25, 26 are insulated from the heat dissipating bridge with alumina for example.

For example, one can use a metallic insulated substrate consisting of a metal base plate covered with a polymer insulator, then with a sheet of conducting material, such as copper, which is then stamped to form the insulated electrical circuit. Then, alumina is interposed between the heat dissipating bridge and the insulated substrate. For more information, refer to document EP A 1 032 114.

Here, a single track 26 carries the electronic components in the form of chips, called positive chips, that define the positive half bridges as described in the aforementioned document EP A 1 032 114. This track 26, which is U-shaped, is extended by a tab 27 shaped to form the positive terminal of the alterno-starter. The tracks 25 each carry the chips, called negative chips, that define a negative half-bridge and are each formed to present a crimping pin 28 used to mount the appropriate winding of the field coil. The chips, such as MOSFET type transistors, are connected through wire links.

The negative chips are connected to the ground. The negative terminal is not visible. Nevertheless, the bridge of the rear bearing is advantageously insulated to prevent disturbances when the alternator operates in electric motor mode.

All this depends on the applications.

The cooling device for the alterno-starter that has just been described may also be used in a traditional alternator. In effect, the device according to the invention may also very advantageously be used when the rear bearing generates a lot of heat. In this case, in order to cool the power electronics, limited here to the bridge rectifier, the device according to the invention achieves a thermal decoupling between the rear bearing and the heat dissipating bridge so that there is no exchange of heat by conduction between the heat dissipating bridge and the rear bearing of the alternator. It may, generally, be used for any type of alternator that has a rotor with prongs or projecting poles.

Of course, this invention is not limited to the fabrication examples described.

In particular, arrangements can be used to reduce charge losses in the passageway 17 and prevent fluid recirculation within the passageway.

Thus, in a variant, the fins 18 axially decrease in height. For example, the fins 18 are axially higher at the internal periphery of the passageway 17 than at the external periphery of the passageway 17 to have the most constant air flow speed possible.

In variants, at least one radially shorter fin is mounted between two consecutive fins belonging to a first series of fins extending from the external periphery to the internal periphery of the passageway 17.

In a variant, at least some of the fins 18 are split so that air circulation is created between the two surfaces of a fin 18 going from the side where the static pressure is strongest to the side where it is weakest. In this way, detachment of the boundary layer of the cooling fluid, air in this case, and recirculation of this fluid in the opposite direction is prevented.

Charge losses are thus reduced and the cooling of the heat dissipating bridge 16 is improved.

The slots are straight or inclined in relation to the bottom 160 of the heat dissipating bridge 16. The fins are, in one variant, split into at least two parts.

The fins may have a winding or varying form.

At least some of the fins may be replaced with columns so that the cooling means can have fins and columns.

All combinations are possible as shown in FIGS. 4 to 12.

Figure 4:
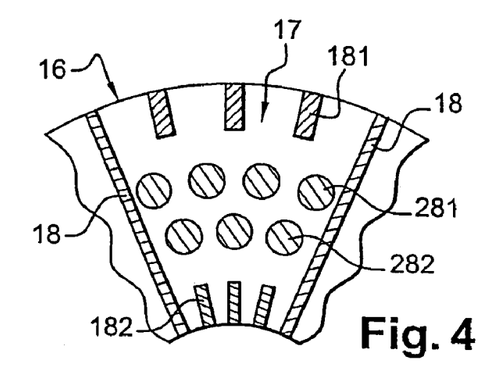
FIGS. 4 to 6, 8 and 10 are partial views from below the lower surface of the heat dissipating bridge turned toward the rear bearing for different fabrication methods.

Thus, in FIG. 4, we see at 18 two fins with a radial orientation delimiting one channel of the passageway 17 according to the invention. Between these two consecutive fins 18 belonging to a first series of fins, there is at least one fin 181, in this case three fins, belonging to a second series of radially shorter fins.

The fins 181 are located on the external periphery of the passageway 17. Short fins 182 are located on the internal periphery of the passageway 17 between the two consecutive fins 18. These fins, three in this case, are generally radially aligned with the fins 181 so that there are slots between the generally radially aligned fins 181, 182.

In one fabrication method, these slots are narrow. Here, the slots are wide so that two circumferential rows 281, 282 of columns are placed radially between the fins 181 and 182. These columns are placed on two circumferences and are circular here (with an oval section or a diamond section in one variant), as seen at 381 on FIG. 7 in which the arrow shows the path of the air. These fins are mounted in a quincunx.

Figure 5:
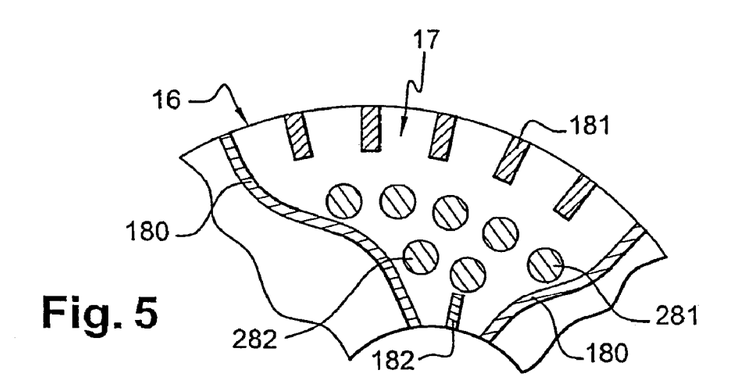

As a variant, as shown in FIG. 5, the consecutive fins 180 of the first series of fins are winding in shape (in this case uncurved), to create a venturi effect and optimize the air flow speed.

In this case, the number of fins 182, 282 is reduced, while the number of fins 181, 281 is increased. The entrance of the passageway 17 between the fins 18 is circumferentially larger than the outlet of this passageway.

All these provisions improve the thermal exchange surface of the heat dissipating bridge with the air and manages the air flow under the power electronics. In addition, this facilitates the fabrication of the bridge 16 because this bridge does not only use thin fins.

Figure 6:
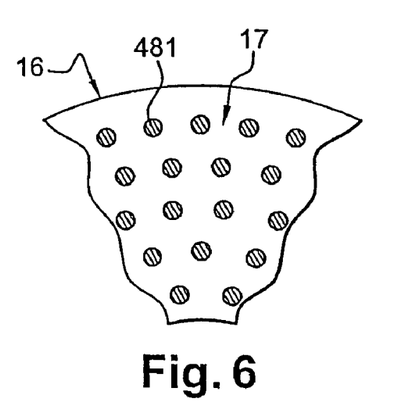
Figure 7:
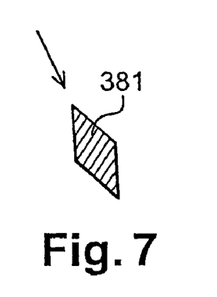
FIG. 7 is a view of the section of a column, constituting a cooling means according to the invention, for one fabrication variant.

Of course, the cooling means may also have only columns 481, as shown in FIG. 6.

Figure 8:
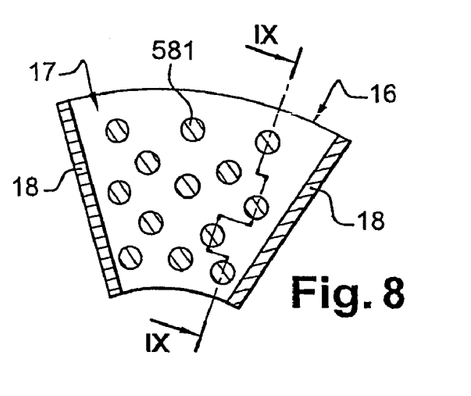
Figure 9:
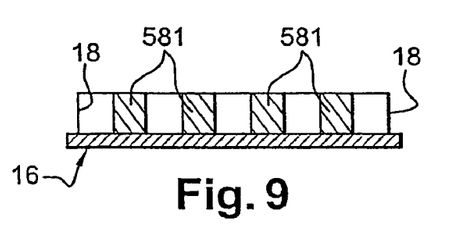
FIGS. 9 and 11 are cross-section views along the IX—IX and XI—XI lines respectively of FIGS. 8 and 10.

These columns, which are circular in this case, may be radially aligned or circumferentially offset like the columns of the rows 281, 282 of FIG. 4 and as shown at 581 in FIG. 8. In a variant, the columns are rectangular. In these cases, this means splitting each fin 18 into multiple parts separated from each other by slots.

Figure 12:
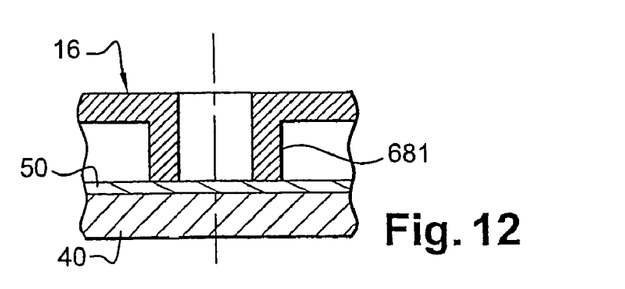
FIG. 12 is a partial cross-section of the mounting of the heat dissipating bridge on the bottom of the rear bearing.

It will be appreciated that the columns reinforce the mechanical behavior of the heat dissipating bridge. With columns, it become possible to machine the free ends of the columns so that, in one fabrication method, the columns are in contact with the bottom 40 of the bearing 4. This contact is direct or, in an indirect variant, a thermally insulating layer, visible for example at 50 in FIG. 12, is interposed between the free ends of the columns and the bottom 40 of the rear bearing 4.

Some of these columns may form the contacts 21 in FIG. 3, so that play can exist between the bottom 40 of the bearing 4 and the free ends of these other columns.

Figure 10:
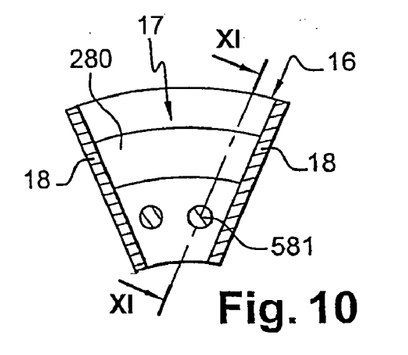
Figure 11:
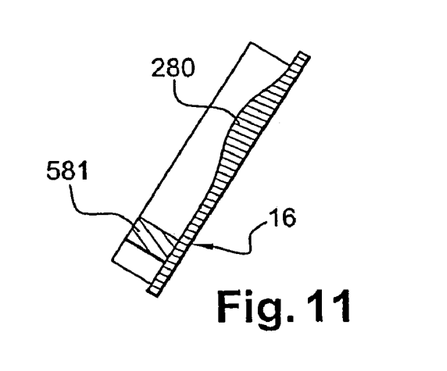

Of course, the bottom of the heat dissipating bridge 16, more specifically the lower surface of the bridge turned toward the bottom of the rear bearing, may have at least one cambered section as seen at 280 in FIGS. 10 and 11, to move the air and create a venturi effect in the passageway 17 to optimize the air flow speed.

This arrangement is another form of the cooling means according to the invention.

The columns in one fabrication method do not have the same section.

Some of the columns may be hollow on the inside, as seen at 681 in FIG. 12, so that this column forms one of the mounting contacts 21 in FIG. 3. This contact may be crossed by the mounting braces or screws 20 in FIG. 2.

Some of these columns may consist of heat pipes that have a condensation zone located in the passageway 17 and an evaporation zone that absorbs heat and is in contact with the lower surface of the heat dissipating bridge 16.

This heat pipe is hollow on the inside and has an enclosure that holds a fluid under pressure, such as water. The heat pipe enclosure is, for example, copper, stainless steel, or nickel. This heat pipe takes heat at the level of the heat dissipating bridge, passing from a liquid state to a gaseous state. It returns the heat in the passageway 17.

Of course, the heat dissipating bridge 16 is, in a variant, in the shape of a horseshoe or a ring.

In a variant, the heat dissipating bridge can carry the voltage regulator and/or the pilots (drivers) to control the electronic components 15, such as chips in the form of transistors that belong to a bridge rectifier that converts the alternating current produced by the stator 3 into direct current; this bridge is also, as described above, a control bridge when current is injected into the components 15 under the control of the drivers.

The branches of this bridge may form modules with the associated driver. Generally, the power electronics circuit 15 has several components and several parts.

One or more drivers may be provided. For example, there is a single driver to control all the chips that form the controlled switches. In a variant, there is one driver per chip to be controlled or one driver per branch of the bridge. Thus, the heat dissipating bridge, in one fabrication method, carries the entire power part of the command and control unit of the alterno-starter, i.e. the chips and the driver or drivers. The management and control part, as well as the voltage regulator driving the excitation winding of the rotor are mounted in an external box.

The mounting of the electronics circuit 15 on the heat dissipating bridge may be fabricated as described in document WO 03/051095 to which we will refer. Thus, this circuit has metal tracks, in copper for example, designed to receive the chips. Resin, for example the thermoplastic type, is injected and reveals, with a mold, parts accessible at the level of the lower and upper surfaces of the tracks for the mounting of the chips on the upper surface of the tracks. The lower accessible surface of the tracks is right on top of the chips.

Then a heat conducting and electrically insulating element is interposed between the tracks and the heat dissipating bridge 16. This element may be epoxy resin or polyamide with adhesive surfaces. In a variant, this is a thermoconducting glue with glass beads.

Then, a protective cover is mounted.

It will be appreciated that the rear bearing is not substantially modified in terms of the bearing in FIG. 1. This bearing has no housing to mount negative diodes and possibly has contacts to mount the bridge.

The cooling means here are the mechanical type and have at least one projection that belongs to the second surface of the heat dissipating bridge 16 and is mounted in the passageway 17.

The invention claimed is:

1. A rotating electrical machine comprising:
   a rear bearing;
   a rotor centered and mounted on a rotating shaft supported by at least the rear bearing, the rear bearing comprising radial outlets for a cooling fluid;
   a stator surrounding the rotor, the stator comprising a field coil that has windings forming the phases of the electrical machine;
   a power electronics circuit connected to the windings of the stator phases;
   a heat dissipating bridge that has a first surface on which the power electronics circuit is mounted and a second surface, opposite said first surface and oriented toward the rear bearing;
   wherein said second surface forms a wall for a radial flow passageway for the flow of cooling fluid, and another wall for the radial flow passageway is formed by the rear bearing supporting the rotor;
   wherein the second surface of the heat dissipating bridge has cooling means arranged in the fluid flow passageway; and
   wherein the cooling means are arranged radially in the direction of the cooling fluid flow.

2. The rotating electrical machine according to claim 1, wherein the cooling means include cooling fins.

3. The rotating electrical machine according to claim 2, wherein the axial end of the fins integrated in the heat dissipating bridge are located separate from the rear bearing.

4. The machine according to claim 2, wherein the cooling fins form radially oriented cooling channels.

5. The rotating electrical machine according to claim 1, wherein the cooling means have columns.

6. The machine according to claim 5, wherein the cooling means comprise fins and columns.

7. The machine according to claim 5, wherein at least a plurality of the columns form contacts for mounting the heat dissipating bridge to the rear bearing.

8. The rotating electrical machine according to claim 1, wherein the cooling means are formed with at least one cambered portion of the second surface of the heat dissipating bridge.

9. The rotating electrical machine according to claim 8, wherein it has a protective hollow cover covering the power electronics circuit and the heat dissipating bridge and the deflector are formed at the free end of the cover.

10. The rotating electrical machine according to claim 8, wherein the heat dissipating bridge is mounted on the rear bearing with mounting braces.

11. The rotating electrical machine according to claim 1, wherein at least one space is provided between the rotating shaft of the rotor and the heat dissipating bridge forming an axial fluid flow passageway.

12. The rotating electrical machine according to claim 1, wherein the second surface of the heat dissipating bridge comprises a planar surface disposed above the rear bearing.

13. The rotating electrical machine according to claim 12, wherein the heat dissipating bridge is mounted above the rear bearing with contacts integrated in the heat dissipating bridge.

14. The rotating electrical machine according to claim 1, further comprising a layer of electrically insulating material disposed between the heat dissipating bridge and the rear bearing.

15. The rotating electrical machine according to claim 1, wherein the heat dissipating bridge, comprising the cooling means, and the bridge carrying the power electronics circuit are a single piece.

16. The rotating electrical machine according to claim 1, wherein the power electronics circuit comprises power components placed on tracks.

17. The rotating electrical machine according to claim 1, further comprising a reversible alternator.

18. A rotating electrical machine comprising:
a rear bearing;
a rotor centered and mounted on a rotating shaft supported by at least the rear bearing, the rear bearing comprising radial outlets for a cooling fluid;
a stator surrounding the rotor, the stator comprising a field coil that has windings forming the phases of the electrical machine;
a power electronics circuit connected to the windings of the stator phases;
a heat dissipating bridge that has a first surface on which the power electronics circuit is mounted and a second surface, opposite said first surface and oriented toward the rear bearing;
wherein said second surface forms a wall for a radial flow passageway for the flow of cooling fluid, and another wall for the radial flow passageway is formed by the rear bearing supporting the rotor;
wherein the second surface of the heat dissipating bridge has cooling means arranged in the fluid flow passageway; and
wherein the rear bearing has a bottom that forms one of the walls of the radial flow passageway, wherein the bottom is extended to its external periphery by an edge equipped with lateral outlets and wherein the rear bearing holds at least one deflector placed at the exit of the lateral outlets of the edge of the rear bearing.

19. The rotating electrical machine according to claim 18, wherein a free end of the cover is flared to form the deflector.

20. The rotating electrical machine according to claim 18, wherein the protective cover has at least one opening that communicates with the cooling fluid flow passageway.

* * * * *